US009674726B1

(12) United States Patent
Holmer

(10) Patent No.: US 9,674,726 B1
(45) Date of Patent: Jun. 6, 2017

(54) METHODS AND SYSTEMS FOR IMPROVED BANDWIDTH ESTIMATION

(71) Applicant: GOOGLE INC., Mountain View, CA (US)

(72) Inventor: Stefan Holmer, Stockholm (SE)

(73) Assignee: GOOGLE INC., Mountain View, CA (US)

( * ) Notice: Subject to any disclaimer, the term of this patent is extended or adjusted under 35 U.S.C. 154(b) by 178 days.

(21) Appl. No.: 14/550,325

(22) Filed: Nov. 21, 2014

(51) Int. Cl.
*H04W 24/10* (2009.01)
*H04W 72/04* (2009.01)
*H04L 12/26* (2006.01)

(52) U.S. Cl.
CPC ....... *H04W 24/10* (2013.01); *H04W 72/0446* (2013.01); *H04L 43/0876* (2013.01)

(58) Field of Classification Search
CPC ... H04L 47/10; H04L 43/0852; H04L 47/283; H04L 47/25; H04L 41/0896; H04L 47/28; H04L 47/12; H04L 47/263; H04L 1/0002; H04L 43/106; H04L 12/5602; H04L 41/5009; H04L 43/0876; H04N 21/6373; H04W 28/0289; H04W 28/06; H04W 28/10; H04W 24/10; H04W 72/0446
USPC .......................................... 370/229, 235, 468
See application file for complete search history.

(56) References Cited

U.S. PATENT DOCUMENTS

| | | | |
|---|---|---|---|
| 6,865,185 B1 * | 3/2005 | Patel | H04L 47/12 370/310 |
| 6,996,626 B1 | 2/2006 | Smith | |
| 9,106,787 B1 * | 8/2015 | Holmer | H04L 43/087 |
| 9,143,418 B2 * | 9/2015 | Den Hartog | H04L 43/0882 |
| 2005/0188407 A1 * | 8/2005 | van Beek | H04N 21/2365 725/81 |
| 2006/0088063 A1 * | 4/2006 | Hartung | H04L 43/087 370/498 |
| 2006/0095944 A1 * | 5/2006 | Demircin | H04N 19/172 725/81 |

(Continued)

OTHER PUBLICATIONS

Grieco, Luigi Alfredo, and Saverio Mascolo, "End-to-End Bandwith Estimation for Congestion Control in Packet Networks", Quality of Service in Multiservice IP Networks, pp. 645-658, Springer Berlin Heidelberg, 2003.

(Continued)

*Primary Examiner* — Jeffrey M Rutkowski
*Assistant Examiner* — Shah Rahman
(74) *Attorney, Agent, or Firm* — Young Basile Hanlon & MacFarlane, P.C.

(57) ABSTRACT

Provided are methods and systems for estimating bandwidth in a communications network in which time slotting is occurring. A pre-filter is used to alter the distribution of transit deltas between data packets transmitted over the network to a receiver. By calculating the differences between arrival times of consecutive data packets received at a receiving end, and comparing the differences between the arrival times of the packets to the differences between corresponding send times for the packets, a determination is made as to whether such packets should be logically grouped together so as to constitute a single arrival event. The sum of the payload sizes of data packets within a group, together with timestamps for the arrival time and send time of the last packet included in the group is used as input to a bandwidth estimator.

20 Claims, 6 Drawing Sheets

(56) References Cited

U.S. PATENT DOCUMENTS

| | | | |
|---|---|---|---|
| 2006/0114834 A1 | 6/2006 | Cheung et al. | |
| 2006/0209838 A1 | 9/2006 | Jung et al. | |
| 2006/0239204 A1* | 10/2006 | Bordonaro | H04L 41/5009 370/253 |
| 2007/0008883 A1* | 1/2007 | Kobayashi | H04L 47/40 370/230 |
| 2007/0223529 A1* | 9/2007 | Lee | H04L 41/5019 370/468 |
| 2009/0122717 A1 | 5/2009 | Das et al. | |
| 2010/0110922 A1 | 5/2010 | Ketheesan et al. | |
| 2010/0121972 A1* | 5/2010 | Samuels | H04L 41/082 709/231 |
| 2010/0150171 A1* | 6/2010 | Rodbro | H04L 43/0852 370/468 |
| 2012/0281715 A1* | 11/2012 | Shojania | H04L 12/2671 370/468 |
| 2013/0083654 A1* | 4/2013 | Lee | H04L 47/283 370/230 |
| 2014/0269401 A1* | 9/2014 | Gondi | H04L 43/0876 370/253 |

OTHER PUBLICATIONS

Jacobsson, Krister, Hakan Hjalmarsson, Niels Moller, and Karl Henrik Johansson, "Estimation of RTT and Bandwith for Congestion Control Applications in Communication Networks", 43rd IEEE Conference on Decision and Control (CDC), Atlantis, Bahamas, Dec. 2004.

Katabi, Dina, and Charles Blake, "Inferring Congestion Sharing and Path Characteristics from Packet Interarrival Times", Mass. Inst. Technol., Cambridge, MA, MIT-LCS-TR-828 (2001).

Mohtashamzadeh, Mehdi, "Kalman Filter Based Congestion Controller", International Journal of Distributed & Parallel Systems, 4, No. 3 (2013).

Paxson, Vern, "End-to-End Internet Packet Dynamics", ACM SIGCOMM Computer Communication Review, vol. 27, No. 4, pp. 139-152, 1997.

\* cited by examiner

METHODS AND SYSTEMS FOR IMPROVED BANDWIDTH ESTIMATION

BACKGROUND

With many existing Wi-Fi connections (e.g., connections over any wireless local area network (WLAN)), data packets (e.g., containing audio and/or video data) being transmitted over the network arrive at a receiving end in a very jittery pattern. Such a pattern can cause problems for a bandwidth estimator that may be monitoring packet inter-arrival times to detect congestion in the network.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for signal processing. More specifically, aspects of the present disclosure relate to estimating bandwidth for a communications network based on grouping unexpectedly arriving packets into a single arrival event.

One embodiment of the present disclosure relates to a computer-implemented method comprising: determining a difference in arrival times of a first data packet and a second data packet at a receiving side in a communications network; determining that the difference in the arrival times of the first and second data packets at the receiving side in the communications network is less than a threshold period of time; determining that the difference in the arrival times of the first and second data packets at the receiving side in the communications network is less than a difference in corresponding send times of the first and second data packets from a sending side in the communications network; grouping the first and second data packets into a logical group of data packets; and performing bandwidth estimation for the network based on the group of data packets.

In another embodiment, the bandwidth estimation of the method is performed based on the group of data packets constituting a single arrival event at the receiving side in the communications network.

In another embodiment, performing bandwidth estimation in the method includes updating a bandwidth estimator based on an arrival time for the last data packet added to the group of data packets, a send time for the last data packet added to the group of data packets, or a combined payload size determined for the group of data packets.

In another embodiment, performing bandwidth estimation in the method includes updating a bandwidth estimator based on an arrival time for the last data packet added to the group of data packets, a send time for the last data packet added to the group of data packets, and a combined payload size determined for the group of data packets.

In another embodiment, the method further comprises: comparing the difference in the arrival times for the first and second data packets to a threshold period of time; and determining, based on the comparison, that the difference in the arrival times for the first and second data packets is less than the threshold period of time.

In yet another embodiment, the method further comprises: combining a payload size of the first data packet with a payload size of the second data packet; and using the combined payload size as input to a bandwidth estimator.

In another embodiment, the method further comprises: determining that a difference between an arrival time of a third data packet at the receiving side in the communications network and the arrival time of the second data packet is less than the threshold period of time; determining that the difference between the arrival times of the second and third data packets at the receiving side in the communications network is less than a difference between a corresponding send time for the third data packet from a sending side in the communications network and the send time for the second data packet; and adding the third data packet to the group of data packets.

In yet another embodiment, the method further comprises using a pre-filter to alter the distribution of differences in network transit times between data packets transmitted over the communications network.

In still another embodiment, the method further comprises, in response to determining that the difference between the send times for the first and second data packets and the arrival times for the first and second data packets is greater than 0, determining that one of the first data packet and the second data packet was delayed during transmission over the communications network.

Another embodiment of the present disclosure relates to a system comprising at least one processor and a non-transitory computer-readable medium coupled to the at least one processor having instructions stored thereon that, when executed by the at least one processor, causes the at least one processor to: determine a difference in arrival times of a first data packet and a second data packet at a receiving side in a communications network; determine that the difference in the arrival times of the first and second data packets at the receiving side in the communications network is less than a threshold period of time; determine that the difference in the arrival times of the first and second data packets at the receiving side in the communications network is less than a difference in corresponding send times of the first and second data packets from a sending side in the communications network; group the first and second data packets into a logical group of data packets; and perform bandwidth estimation for the network based on the group of data packets.

In another embodiment, the at least one processor of the system is further caused to perform the bandwidth estimation based on the group of data packets constituting a single arrival event at the receiving side in the communications network.

In another embodiment, the at least one processor of the system is further caused to update a bandwidth estimator based on an arrival time for the last data packet added to the group of data packets, a send time for the last data packet added to the group of data packets, or a combined payload size determined for the group of data packets.

In yet another embodiment, the at least one processor of the system is further caused to update a bandwidth estimator based on an arrival time for the last data packet added to the group of data packets, a send time for the last data packet added to the group of data packets, and a combined payload size determined for the group of data packets.

In another embodiment, the at least one processor of the system is further caused to: compare the difference in the arrival times for the first and second data packets to a threshold period of time; and determine, based on the comparison, that the difference in the arrival times for the first and second data packets is less than the threshold period of time.

In another embodiment, the at least one processor of the system is further caused to: determine that a difference between an arrival time of a third data packet at the receiving side in the communications network and the arrival time of the second data packet is less than the threshold period of time; determine that the difference between the arrival times of the second and third data packets at the receiving side in the communications network is less than a difference between a corresponding send time for the third data packet from a sending side in the communications network and the send time for the second data packet; and add the third data packet to the group of data packets.

In yet another embodiment, the at least one processor of the system is further caused to: use a pre-filter to alter the distribution of differences in network transit times between data packets transmitted over the communications network.

In still another embodiment, the at least one processor of the system is further caused to: in response to determining that the difference between the send times for the first and second data packets and the arrival times for the first and second data packets is greater than 0, determine that one of the first data packet and the second data packet was delayed during transmission over the communications network.

Another embodiment of the present disclosure relates to one or more non-transitory computer readable media storing computer-executable instructions that, when executed by one or more processors, causes the one or more processors to perform operations comprising: determining differences in arrival times between pairs of consecutively transmitted data packets at a receiving end in a communications network; for each pair of data packets: determining whether the difference in the arrival times of the data packets comprising the pair is less than a threshold period of time, determining whether the difference in the arrival times of the data packets comprising the pair is less than a difference in corresponding send times of the data packets from a transmitting end in the communications network, and responsive to determining that the difference in the arrival times of the data packets comprising the pair is less than the threshold period of time and less than the difference in the corresponding send times of the data packets comprising the pair, adding the data packets comprising the pair to a group of data packets; and updating a bandwidth estimator for the communications network based on the group of data packets.

It should be noted that embodiments of some or all of the processor and memory systems disclosed herein may also be configured to perform some or all of the method embodiments disclosed above. In addition, embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
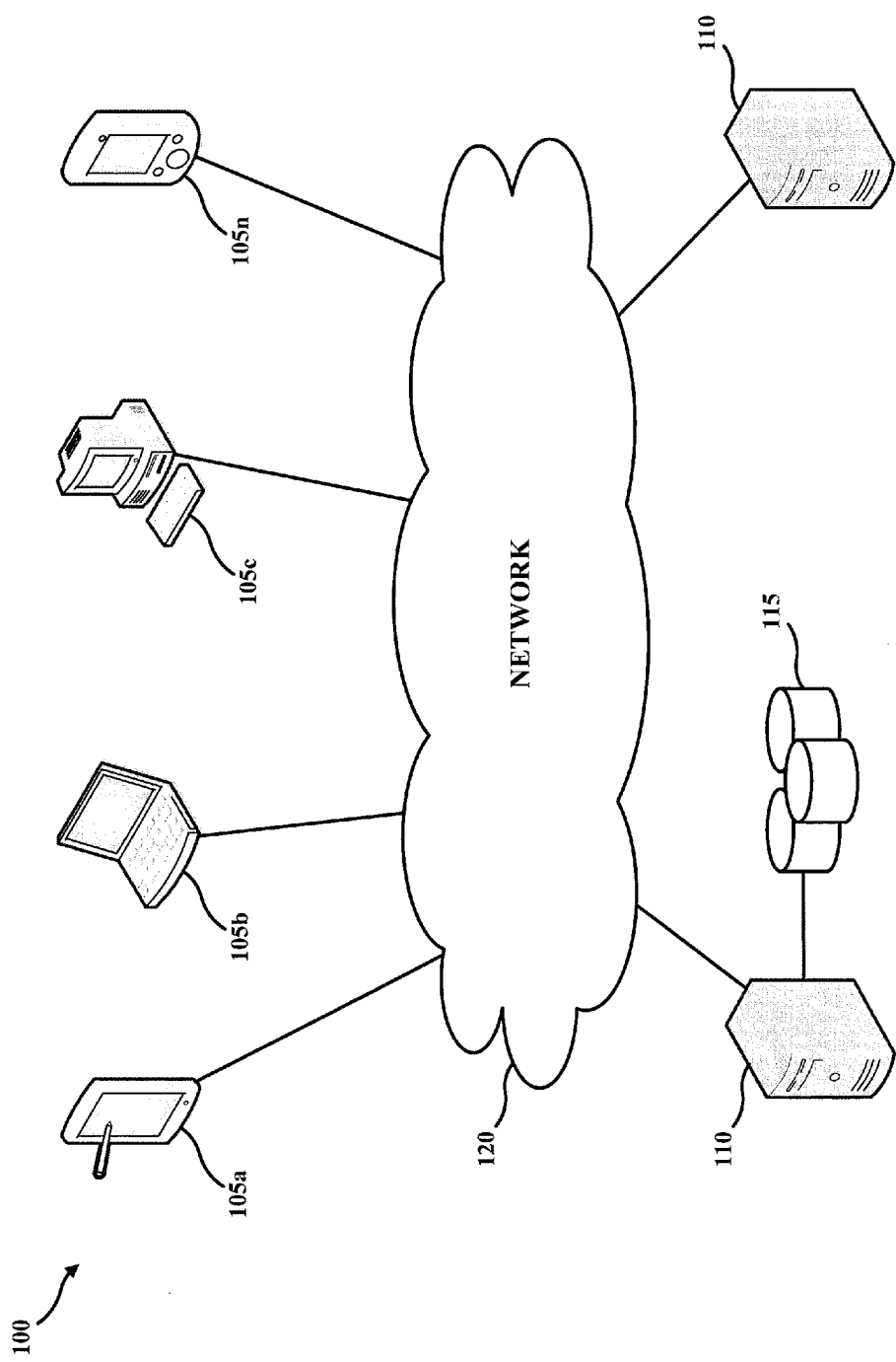
FIG. 1 is a schematic diagram illustrating an example application for estimating bandwidth for a communications channel based on grouping unexpectedly arriving data packets into a single arrival event according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

Users of "congested" networks (e.g., networks where there may be several access points and Wi-Fi networks on the same channel) often experience degraded quality in terms of audio and video. In some scenarios, a bandwidth estimator may be utilized to help detect network congestion by monitoring the inter-arrival times of data packets (e.g., containing audio and/or video data) transmitted over the network to a receiving end. In this manner, the bandwidth estimator can determine whether delay in transmission of the packets over the network is increasing.

The methods and systems of the present disclosure have numerous real-world applications. For example, the methods and systems may be implemented in computing devices (e.g., laptop computers, desktop computers, etc.) to achieve higher bandwidth and quality of transmitted media (e.g., audio, video, data, mixed media, etc.) on wireless communication links, thereby improving quality for video conferencing, sound recording, and the like. FIG. 1 illustrates an example 100 of such an application, where one or more user devices 105a-105n (where "n" is an arbitrary number) may be communicating with each other and/or with one or more servers 110 over a network 120 (e.g., any kind of network including, for example, Ethernet, wireless LAN, cellular network, etc.), where such communication includes, for example, the transmission of data (e.g., audio data, video data, mixed media, etc.) over the network 120. For example, one or more of user devices 105a-105n may be participating in a video conference, may be recording audio data being streamed from a website, and the like.

As will be described in greater detail below, the present disclosure reveals that, periodically, packets being transmitted over a network to a receiver (e.g., transmitted over network 120 to one or more of user devices 105a-105n in the example 100 shown in FIG. 1) are delayed for a period of time (e.g., 100 milliseconds (ms)) during transmission and then delivered to the receiver in a back-to-back manner. In other words, at some point between the time when a data packet is provided to a network adapter for transmission over the network to a receiver, and the time that the packet arrives at the receiver, the packet is held up (or delayed) for some period of time before being delivered back-to-back with other packets. Such a pattern suggests that the Wi-Fi access point is performing time slotting to share the channel between different Wi-Fi networks on the same channel without causing interference, that there are lower layer retransmissions being performed, or some other action or inaction is occurring during transmission of the packets over the network.

Figure 2:
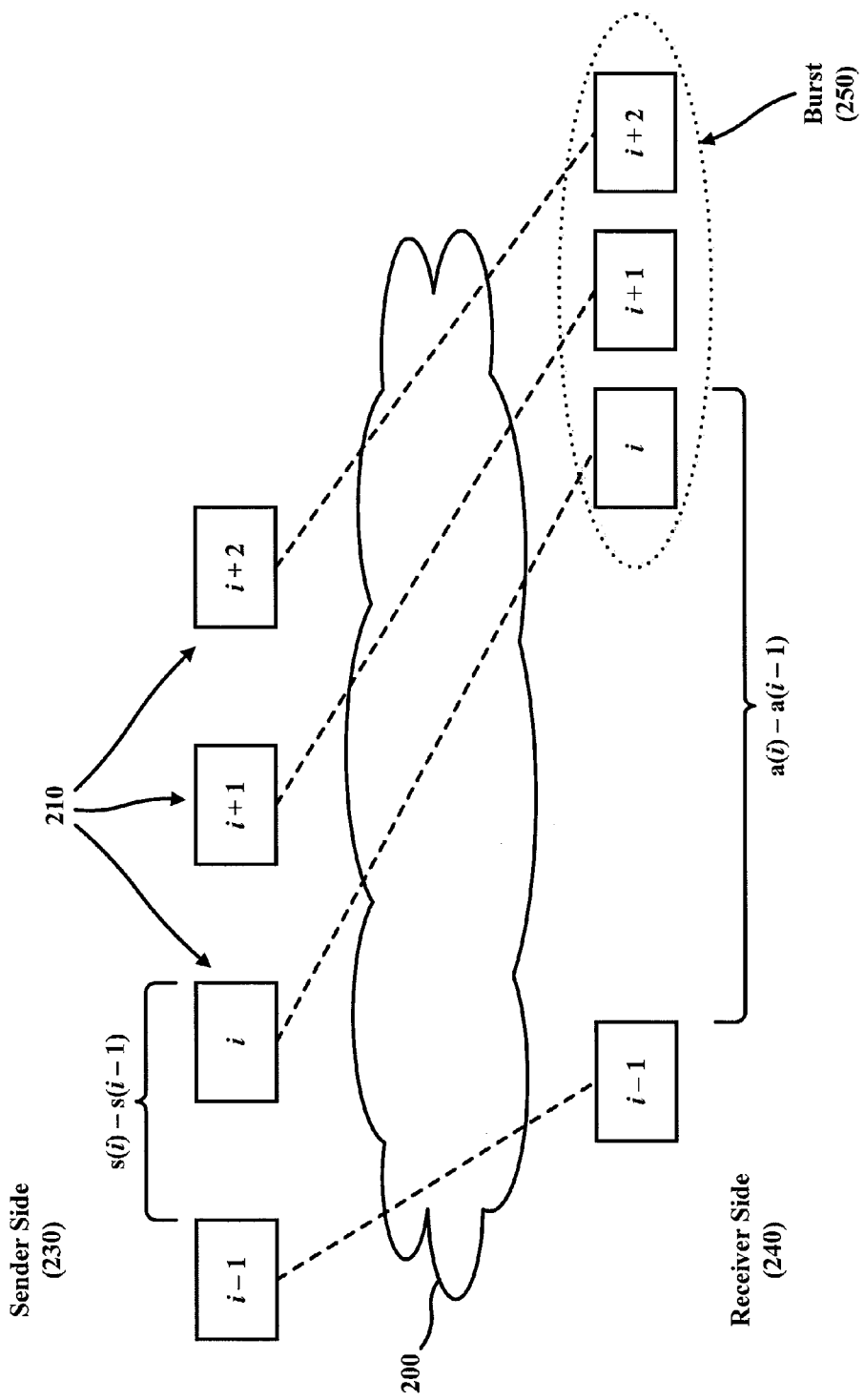
FIG. 2 is a schematic block diagram illustrating an example of packets being sent in a regular pattern from a sending side of a communications channel, but arriving in bursts at a receiving side of the communications channel.

FIG. 2 illustrates an example of this scenario. Packets 210 are being sent out from the sender side 230 in a regular pattern (e.g., with approximately the same amount of time passing between the sending of each packet). However, rather than arriving at the receiver side 240 in a regular pattern, some of the packets 210 arrive at the receiver side 240 in a back-to-back manner as a burst 250 of packets.

A pattern like the one described above and illustrated in FIG. 2 can create problems for a bandwidth estimator (e.g., a bandwidth estimation algorithm) that is monitoring packet inter-arrival times to detect congestion on the network. Such a bandwidth estimator may be implemented at the receiver or receiving end of a communications channel over the network, may be operating at a server connected to the network to monitor network conditions, including congestion, or may be implemented in one or more other ways known to those skilled in the art. For example, it is difficult for the bandwidth estimation algorithm to differentiate between packets being delayed due to time slotting and packets being delayed due to the overuse of a link along the communication path. It is important to note that time slotting does not necessarily occur because a particular link has been over-utilized, but instead may happen as soon as two or more Wi-Fi networks share a channel (e.g., divide the total capacity of the wireless link by the number of clients sharing the link).

It should also be noted that issues similar to those discussed above with respect to time slotting can also occur for other reasons, such as, for example, lower layer retransmissions if the lower layer aims at delivering packets in sequence (thus holding back packets until the lost packets have been retransmitted). Time slotting, lower layer retransmission, as well as various other actions and/or inactions occurring in the transmission of packets over a network can result in two potential issues with respect to the bandwidth estimator.

First, the bandwidth estimator, which is estimating network bandwidth in bits per second, may falsely detect network congestion and reduce the estimated bit rate of the network, even though a higher rate is possible. Second, the arrival of packets in bursts, or "bursty arrival" of packets (e.g., periods of delay followed by groups of packets arriving in a back-to-back fashion) may cause the bandwidth estimator to perform more filtering in order to suppress the bursts and be able to differentiate between actual congestion and bursty arrivals. It should be noted that while the second issue described above may help to resolve the first issue, the second issue can also make an applicable network system operate very slowly (e.g., where a Kalman filter, which is optimized for Gaussian distributions, is used to filter the network transit deltas in the system).

With a view towards the potential issues described above, embodiments of the present disclosure relate to methods and systems for estimating bandwidth for a communications network (e.g., channel, system, etc.) in which time slotting, lower layer retransmission, or some other action or inaction in the transmission of packets is occurring by using a pre-filter to alter the distribution of transit deltas between data packets transmitted over the network to a receiver. As will be described in greater detail below, data packets for which a set of conditions are determined to be satisfied may be grouped together (e.g., logically grouped together) such that they may be considered to constitute a single arrival event at the receiver (e.g., receiving end of the communications network).

By calculating the differences between arrival times of consecutive data packets received at the receiving end, and comparing the differences between the arrival times of the packets to the differences between corresponding send times for the packets (as sent from the sending side), a determination may be made as to whether such packets should be logically grouped together so as to constitute a single arrival event at the receiving end. In accordance with one or more embodiments described herein, the sum of the payload sizes of data packets within a group, a timestamp for the arrival time of the last packet included in the group, a timestamp for the send time of the last packet included in the group, or some combination thereof, may be used as input to a bandwidth estimator to detect congestion in the network.

For example, in accordance with at least one embodiment of the present disclosure, data packets arriving at a receiving end of a communication network may be considered part of a group constituting a single arrival event where the following two conditions are satisfied:

$a_i - a_{i-1}$ <threshold (ms), and $d_i$<0, where $d_i = a_i - a_{i-1} - (s_i - s_{i-1})$ is the network transit delta. In accordance with at least one embodiment, the threshold against which the difference in arrival times of consecutive packets may be compared may be set to 5 ms. In such an embodiment, setting the threshold to this value may result in forming logical groups of data packets arriving at the receiving end within 5 ms of each other while at the same time not grouping together packets where the transit delta is positive, which helps avoid grouping packets that are actually sent close to each other and are arriving as expected. In accordance with at least one embodiment, multiple (e.g., more than two) packets may be grouped together. For example, as long as an arriving packet is arriving back-to-back with respect to the previously received packet, both packets may be included in the same group. That same group may continue to be updated (e.g., enlarged or increased) with additional packets until, for example, a packet no longer arrives in a back-to-back manner with respect to the previously received packet.

In accordance with one or more embodiments of the present disclosure, the input to the bandwidth estimator may include the sum of the payload size of packets within a group and the arrival timestamp and send timestamp of the last packet of the group.

In accordance with at least one embodiment, the bandwidth estimator may compare the difference between send timestamps and arrival timestamps of pairs of packets (or groups of packets). For example, if the difference between the send and arrival timestamps (which may also be referred to as "inter-arrival delta" or "network transit time delta") for a pair of packets or for groups of packets is greater than 0, it may be determined that a packet of the pair, or a group of packets has been delayed during transmission over the network. On the other hand, if the difference between the send and arrival timestamps is negative, it may be determined that the packet has caught up with the packet before (or the group of packets has caught up with the group of packets before), and thus the network delay has been reduced. In accordance with at least one embodiment, these inter-arrival deltas may be filtered using, for example, a Kalman filter. However, it should be noted that any averaging filter known to those skilled in the art may also be used in addition to or instead of a Kalman filter.

The Kalman filter that may be used models the network transit time as being part of two terms, one based on the actual speed of the communications link, and one based on the amount of other traffic affecting the data stream. The second term may be modeled as being random (e.g., unknown):

transit time=payload size/link speed+random part, which may be expressed as $T = L/C + M$ where T denotes the transit time, L denotes the payload size, C denotes the link speed, and M denotes the random or unknown part.

The transit time, T, cannot be measured since the packet is time-stamped with a different clock at the sender and at the receiver. As such, the bandwidth estimator (and bandwidth estimation method) of the present disclosure looks instead at the difference in transit times between packets:

$dT = T_i - T_{i-1} = (L_i - L_{i-1})/C + M_i - M_{i-1} = dL/C + dM$

Therefore, in accordance with one or more embodiments of the present disclosure, the Kalman filter that may be used estimates (e.g., measures) dM, which is an indication of how the queuing delay varies. If the estimate of dM is increasing (e.g., the estimate is above a threshold), then the estimated bit rate (e.g., available bandwidth) of the communication channel is reduced. If the estimate of dM is not increasing, then the estimated bit rate of the communication channel may be increased to, for example, probe for more available bandwidth.

In accordance with at least one embodiment of the present disclosure, a pre-filter may be added to a communication system prior to the Kalman filter such that the distribution of transit deltas between data packets arriving at a receiver is closer to a normal distribution.

Figure 5A:
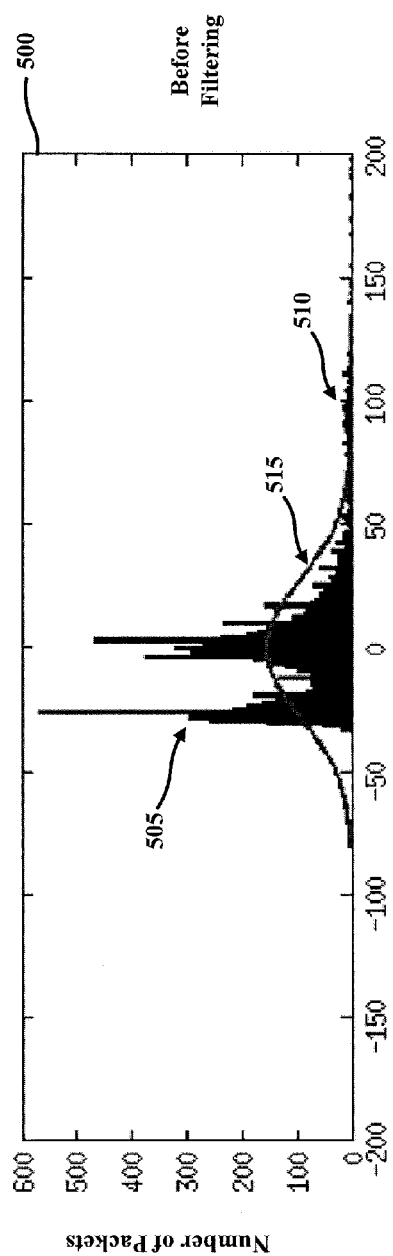
FIG. 5A is a graphical representation illustrating example differences in arrival times of data packets at a receiving end of a communications system before additional filtering is performed according to one or more embodiments described herein.
Figure 5B:
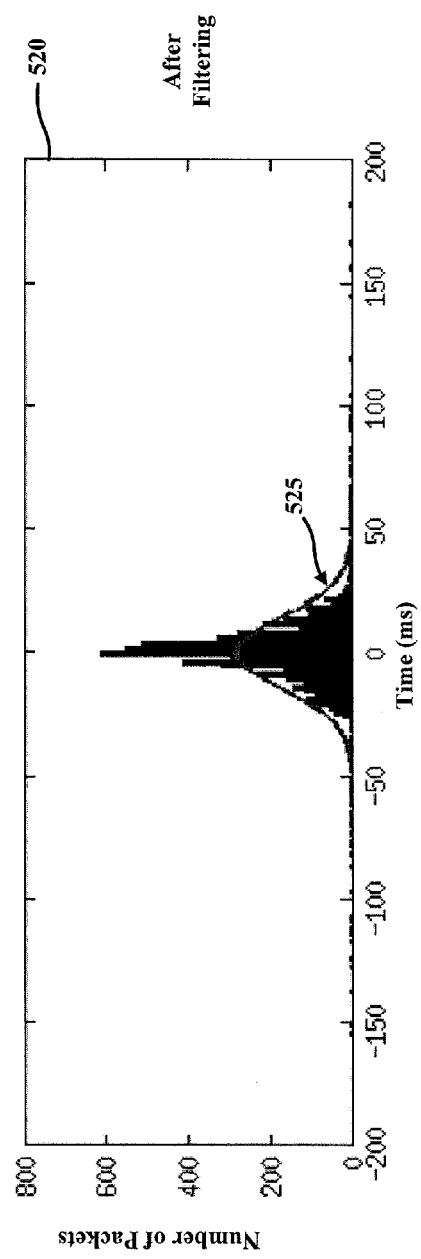
FIG. 5B is a graphical representation illustrating example differences in arrival times of data packets at a receiving end of a communications system after additional filtering is performed according to one or more embodiments described herein.

Referring to FIGS. 5A and 5B, illustrated are example graphical representations of transit deltas for data packets received at a receiving end in a communications system (e.g., differences in arrival times between consecutive packets received at the receiving end). Graphical representation 500 illustrates example transit deltas with a Gaussian distribution 515 prior to any filtering being performed while graphical representation 520 illustrates example transit deltas with a Gaussian distribution 525 after filtering is performed in accordance with the methods and systems described herein.

It should be noted that in graphical representation 500 there are two jumps (505, 510) in the plotted transit deltas that do not match well with the Gaussian distribution 515. The first jump (505) is centered approximately at −30 ms and the second jump (510) is centered approximately at 100 ms. In an example scenario, the first jump (505) may represent data packets arriving at a receiver in a back-to-back manner after being held up during transmission over the network, while the second jump (510) may represent the first packet in a burst of back-to-back packets.

The second jump (510), which is the more spread out jump of the two, may be due, for example, to the first packet arriving in a burst of back-to-back packets. This is because those packets are the most delayed compared to the packet before. The other packets in a burst are often early compared to the packet before since they have been held up in the network back-to-back with the packet before them. Therefore, they are represented by the first jump (505).

In accordance with one or more embodiments of the present disclosure, the jumps in transit deltas (505, 510) illustrated in graphical representation 500 may be eliminated by grouping together packets that are unexpectedly arriving at the receiver in a back-to-back manner and handling them as a single arrival (e.g., as a single arrival event at the receiver).

Figure 3:
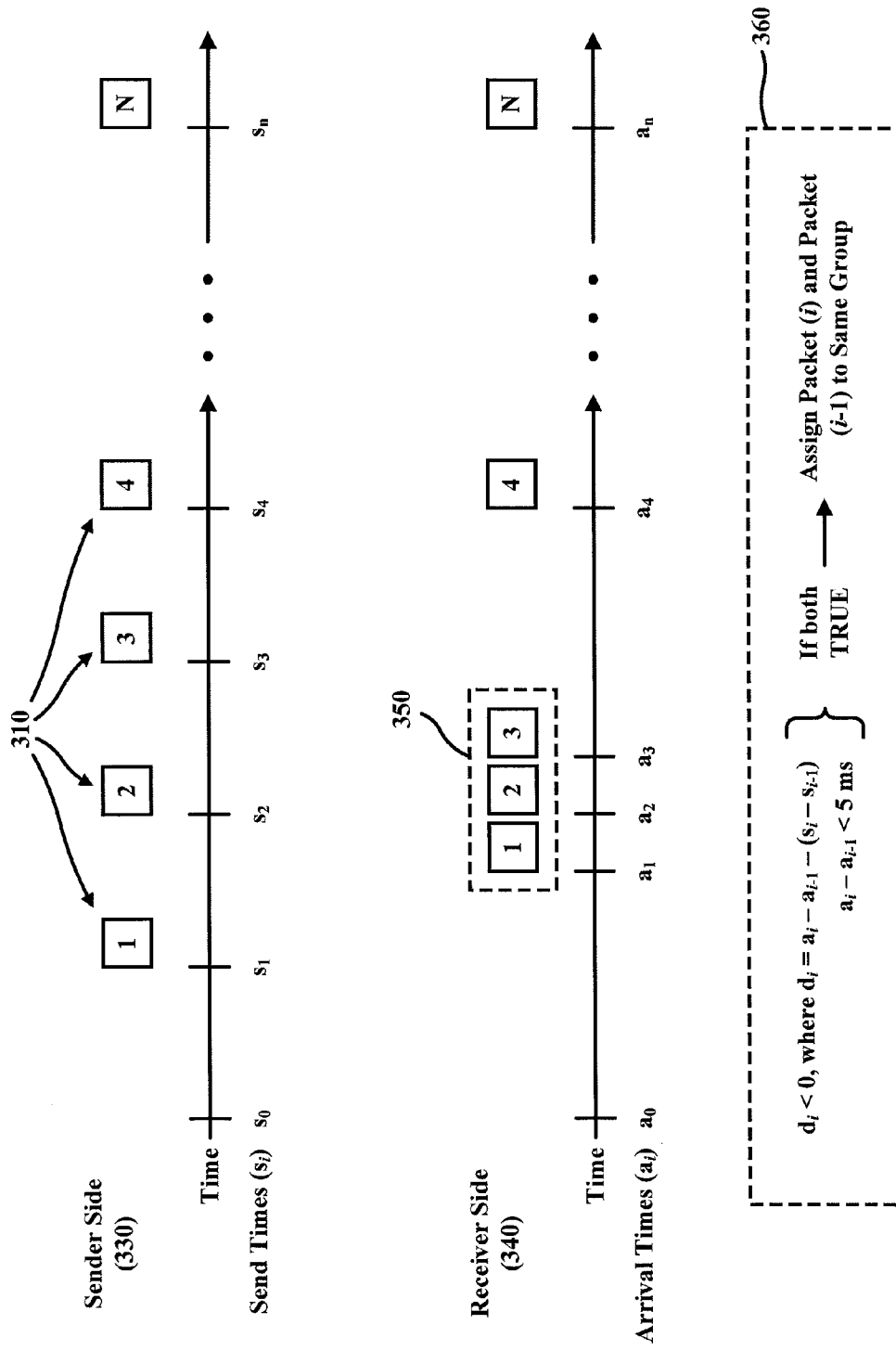
FIG. 3 is a schematic block diagram illustrating an example system for estimating bandwidth by considering a group of data packets arriving within a period of time as a single arrival event according to one or more embodiments described herein.

FIG. 3 is a simplified example of grouping together data packets arriving at receiver side 340 of a communication system with small differences in arrival times as a result of, for example, time slotting, lower layer retransmission, etc., taking place in the communications system at some point after the packets are sent from the sender side 330. In accordance with one or more embodiments described herein, by grouping 350 together data packets 310 based on a determination that two conditions 360 (e.g., thresholds, parameters, etc.) are satisfied, the distribution of transit deltas between the transmitted packets may be modified (e.g., altered, manipulated, etc.) such that the transit deltas may be more closely represented as a normal distribution.

If packets 310 arriving at the receiver side 340 are closely spaced in their arrival times, then it is likely that the packets were forced together by the network (e.g., as a result of time slotting). By looking at the differences in arrival times of consecutive packets at the receiver (e.g., the difference between the arrival times of packets 1 and 2 ($a_2-a_1$), and comparing the differences between the arrival times of the packets to the differences between corresponding send times for the packets (e.g., the difference between ($a_2-a_1$) and ($s_2-s_1$), the difference between ($a_3-a_2$) and ($s_3-s_2$), etc.), a determination may be made as to whether time slotting is likely taking place in the network, and thus whether affected packets should be logically grouped together as constituting a single arrival event at the receiver.

Figure 4:
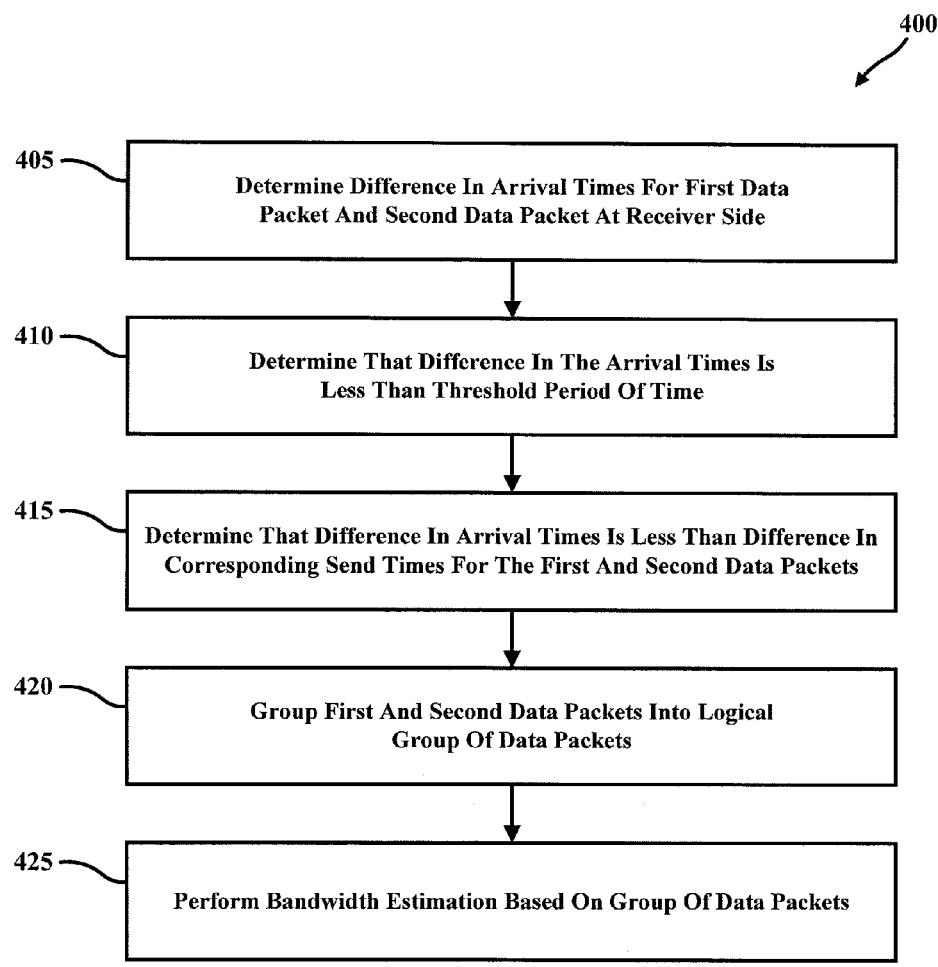
FIG. 4 is a flowchart illustrating an example method for estimating bandwidth for a communications channel by using a pre-filter to alter the distribution of transit deltas between packets transmitted over the channel according to one or more embodiments described herein.

FIG. 4 illustrates an example process 400 for estimating bandwidth for a communications channel in which time slotting (or lower layer retransmission, or some other action/inaction) is occurring by utilizing a pre-filter to alter the distribution of transit deltas between data packets transmitted over the channel, in accordance with one or more embodiments described herein.

At block 405, a determination may be made as to the difference in arrival times between data packets arriving at a receiving side in a communications network. For example, in accordance with at least one embodiment, block 405 may include determining the difference between an arrival time of a first packet at a receiver side of a network (e.g., arrival time $a_1$ of packet 1 at receiver side 340 in the example shown in FIG. 3) and an arrival time of a second packet at the receiver side of the network (e.g., arrival time $a_2$ of packet 2 at receiver side 340 in the example shown in FIG. 3).

At block 410, it may be determined that the difference in arrival times determined at block 405 is less than a threshold period of time. In accordance with at least one embodiment, the threshold period of time against which the difference in arrival times of the first and second data packets may be compared at block 410 may be, for example, 5 ms. In accordance with one or more other embodiments, the threshold period of time that may be used at block 410 may be one or more other periods of time in addition to or instead of the example threshold period of 5 ms described above.

At block 415, it may be determined that the difference in arrival times of the first and second data packets at the receiving side of the communications network (determined at block 405) is less than the difference in the corresponding send times that the first and second data packets were sent from a sending side of the communications network. For example, in accordance with at least one embodiment, and with reference to the example illustrated in FIG. 3 and described above, the determination at block 415 may be made by comparing the difference in the arrival times of packets 1 and 2 ($a_2-a_1$) (e.g., at the receiving end of the network, as determined at block 405) to the difference in the send times of packets 1 and 2 ($s_2-s_1$) (e.g., from the sending side of the network). Based on this comparison, it may be determined at block 415 that the difference in the arrival times of the packets is less than the difference in the send times of the packets (e.g., ($a_2-a_1$)<($s_2-s_1$)).

Based on the determination made at block 415, at block 420 the first and second data packets may be grouped (e.g., added, included,) into a logical group of data packets. It should be understood that in a scenario where the first and second data packets are the first pair of data packets to arrive at the receiving end of the communications network in a back-to-back manner, there is no group in which the first and second data packets can be added at block 415. In such a case, the first and second data packets may be logically grouped together at block 415 to form a logical group of data packets (e.g., to which other data packets that continue to arrive at the receiving end in a back-to-back manner may be logically added). For example, as long as a data packet arriving at the receiving end is arriving back-to-back with respect to the previously received packet, then such arriving data packet may be included in the group of data packets formed initially by the first and second data packets, as described above.

At block 425, a bandwidth estimator for the network may be updated based on the group of data packets to which the first and second data packets were added at block 420. In accordance with at least one embodiment of the present disclosure, updating the bandwidth estimator at block 425 may include performing bandwidth estimation for the network based on the group of data packets. For example, in monitoring the network for the purpose of detecting congestion, the bandwidth estimator may consider the group of packets as constituting a single arrival event at the receiving side of the network.

Although not included as a block in the example process 400 illustrated in FIG. 4, in accordance with one or more embodiments described herein, the sum of the payload sizes of data packets within a logical group of packets, a timestamp for the arrival time of the last packet included in the group, a timestamp for the send time of the last packet included in the group, or some combination thereof, may be used as input to a bandwidth estimator to detect congestion in the network.

As described above, the difference between the send and arrival timestamps for a pair of packets (e.g., as determined at block 415) or for groups of packets may be referred to as an "inter-arrival delta" or "network transit time delta."

In accordance with at least one embodiment, these inter-arrival deltas may be filtered using, for example, a Kalman filter, which models the network transit time (T) as being part of two terms, one based on the actual speed of the communications link (L/C) and one based on the amount of other traffic affecting the data stream (M). The second term (the one based on the amount of other traffic affecting the data stream) may be modeled as being random (e.g., unknown). Accordingly, as described above, the Kalman filter may estimate (e.g., measure) the difference in the random term (dM, which is the difference in the amount of other traffic affecting the data stream) between packets, which is an indication of how queuing delay varies between packets.

If the Kalman filter's estimate of dM is increasing (e.g., the estimate is above a threshold), then the estimated bit rate (e.g., available bandwidth) of the network is reduced. on the other hand, if the Kalman filter's estimate of dM is not increasing, then the estimated bit rate of the network may be increased to, for example, probe for more available bandwidth.

In accordance with at least one embodiment of the present disclosure, a pre-filter may be added to the communication channel prior to the Kalman filter such that the distribution of transit deltas between data packets arriving at the receiving side is closer to a normal distribution.

Figure 6:
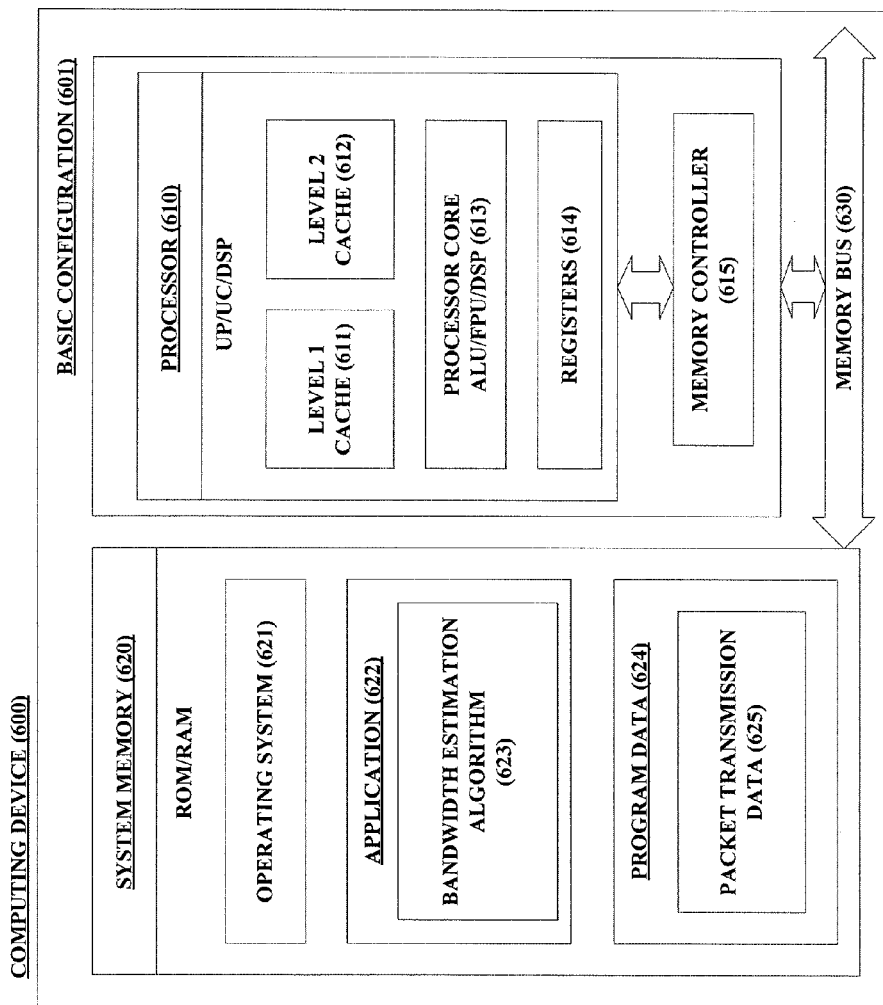
FIG. 6 is a block diagram illustrating an example computing device arranged for estimating bandwidth for a communications channel by grouping packets transmitted over the channel into a single arrival event and utilizing a pre-filter to alter the distribution of transit deltas between the packets according to one or more embodiments described herein.

FIG. 6 is a high-level block diagram of an exemplary computing device (600) arranged for estimating bandwidth for a communications channel by grouping packets transmitted over the channel into a single arrival event and utilizing a pre-filter to alter the distribution of transit deltas between the packets, according to one or more embodiments described herein. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (μP), a microcontroller (μC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (615) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a bandwidth estimation algorithm (623) for estimating bandwidth for a communications channel in which time slotting is occurring by using a pre-filter to alter the distribution of transit deltas for packets transmitted over the channel according to one or more embodiments described herein. Program data (624) may include storing instructions that, when executed by the one or more processing devices, implement a method for estimating bandwidth for a communications channel in which time slotting of transmitted packets is occurring according to one or more embodiments described herein.

Additionally, in accordance with at least one embodiment, program data (624) may include packet transmission data (625), which may include data (e.g., timestamps) about the send times and arrival times of packets transmitted over a network (e.g., data about the send times ($s_i$) and arrival times ($a_i$) of packets 210 in the example shown in FIG. 2). In some embodiments, the application (622) can be arranged to operate with program data (624) on an operating system (621).

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   determining a difference in arrival times of a first data packet and a second data packet at a receiving side in a communications network;
   determining that the difference in the arrival times of the first and second data packets at the receiving side in the communications network is less than a threshold period of time;
   determining a transit time by the difference in the arrival times of the first and second data packets at the receiving side in the communications network from the corresponding send times of the first and second data packets from a sending side in the communications network;

grouping the first and second data packets into a logical group of data packets when the difference of arrival times of the first and second data packets is less than said threshold and when the transit time is less than zero; and performing bandwidth estimation for the network based on the group of data packets.

2. The method of claim 1, wherein the bandwidth estimation is performed based on the group of data packets constituting a single arrival event at the receiving side in the communications network.

3. The method of claim 1, wherein performing bandwidth estimation based on the group of data packets includes:

updating a bandwidth estimator based on an arrival time for the last data packet added to the group of data packets, a send time for the last data packet added to the group of data packets, or a combined payload size determined for the group of data packets.

4. The method of claim 1, wherein performing bandwidth estimation based on the group of data packets includes:

updating a bandwidth estimator based on an arrival time for the last data packet added to the group of data packets, a send time for the last data packet added to the group of data packets, and a combined payload size determined for the group of data packets.

5. The method of claim 1, wherein determining that the difference in the arrival times for the first and second data packets is less than a threshold period of time includes:

comparing the difference in the arrival times for the first and second data packets to a threshold period of time; and determining, based on the comparison, that the difference in the arrival times for the first and second data packets is less than the threshold period of time.

6. The method of claim 5, wherein the threshold period of time is 5 milliseconds (ms).

7. The method of claim 1, further comprising:

combining a payload size of the first data packet with a payload size of the second data packet; and using the combined payload size as input to a bandwidth estimator.

8. The method of claim 1, further comprising:

determining that a difference between an arrival time of a third data packet at the receiving side in the communications network and the arrival time of the second data packet is less than the threshold period of time;

determining that the difference between the arrival times of the second and third data packets at the receiving side in the communications network is less than a difference between a corresponding send time for the third data packet from a sending side in the communications network and the send time for the second data packet; and adding the third data packet to the group of data packets.

9. The method of claim 1, further comprising:

using a pre-filter to alter the distribution of differences in network transit times between data packets transmitted over the communications network.

10. The method of claim 1, further comprising:

responsive to determining that the difference between the send times for the first and second data packets and the arrival times for the first and second data packets is greater than 0, determining that one of the first data packet and the second data packet was delayed during transmission over the communications network.

11. A system comprising:

at least one processor; and a non-transitory computer-readable medium coupled to the at least one processor having instructions stored thereon that, when executed by the at least one processor, causes the at least one processor to:

determine a difference in arrival times of a first data packet and a second data packet at a receiving side in a communications network;

determine that the difference in the arrival times of the first and second data packets at the receiving side in the communications network is less than a threshold period of time;

determine a transit time by the difference in the arrival times of the first and second data packets at the receiving side in the communications network from the corresponding send times of the first and second data packets from a sending side in the communications network;

group the first and second data packets into a logical group of data packets when the difference of arrival times of the first and second data packets is less than said threshold and when the transit time is less than zero; and perform bandwidth estimation for the network based on the group of data packets.

12. The system of claim 11, wherein the at least one processor is further caused to:

perform the bandwidth estimation based on the group of data packets constituting a single arrival event at the receiving side in the communications network.

13. The system of claim 11, wherein the at least one processor is further caused to:

update a bandwidth estimator based on an arrival time for the last data packet added to the group of data packets, a send time for the last data packet added to the group of data packets, or a combined payload size determined for the group of data packets.

14. The system of claim 11, wherein the at least one processor is further caused to:

update a bandwidth estimator based on an arrival time for the last data packet added to the group of data packets, a send time for the last data packet added to the group of data packets, and a combined payload size determined for the group of data packets.

15. The system of claim 11, wherein the at least one processor is further caused to:

compare the difference in the arrival times for the first and second data packets to a threshold period of time; and determine, based on the comparison, that the difference in the arrival times for the first and second data packets is less than the threshold period of time.

16. The system of claim 15, wherein the threshold period of time is 5 milliseconds (ms).

17. The system of claim 11, wherein the at least one processor is further caused to:

determine that a difference between an arrival time of a third data packet at the receiving side in the communications network and the arrival time of the second data packet is less than the threshold period of time;

determine that the difference between the arrival times of the second and third data packets at the receiving side in the communications network is less than a difference between a corresponding send time for the third data packet from a sending side in the communications network and the send time for the second data packet; and add the third data packet to the group of data packets.

18. The system of claim 11, wherein the at least one processor is further caused to:

use a pre-filter to alter the distribution of differences in network transit times between data packets transmitted over the communications network.

19. The system of claim 11, wherein the at least one processor is further caused to:

responsive to determining that the difference between the send times for the first and second data packets and the arrival times for the first and second data packets is greater than 0, determine that one of the first data packet and the second data packet was delayed during transmission over the communications network.

20. One or more non-transitory computer readable media storing computer-executable instructions that, when executed by one or more processors, causes the one or more processors to perform operations comprising:

determining differences in arrival times between pairs of consecutively transmitted data packets at a receiving end in a communications network;

for each pair of data packets:

determining whether the difference in the arrival times of the data packets comprising the pair is less than a threshold period of time, determining a transit time by the difference in the arrival times of the data packets comprising the pair from the corresponding send times of the data packets from a transmitting end in the communications network, and responsive to determining transit time by the difference in the arrival times of the data packets comprising the pair from the corresponding send times of the data packets comprising the pair, adding the data packets comprising the pair to a group of data packets when the difference of arrival times of the first and second data packets is less than said threshold and when the transit time is less than zero; and updating a bandwidth estimator for the communications network based on the group of data packets.

* * * * *